United States Patent
Park et al.

(10) Patent No.: US 8,921,481 B2
(45) Date of Patent: Dec. 30, 2014

(54) COMPOSITION FOR FORMING NON-FLAMMABLE COATING, AND NON-FLAMMABLE COATING OBTAINED THEREFROM

(75) Inventors: No Ohk Park, Chungcheongbuk-do (KR); Jae Woon Yoon, Incheon (KR); Nam Ki Kim, Seoul (KR)

(73) Assignee: James Nohak Pak, Alaska ( * ) Notice: Subject to any disclaimer, the term of this patent is extended or adjusted under 35 U.S.C. 154(b) by 94 days.

(21) Appl. No.: 13/579,235

(22) PCT Filed: Jun. 10, 2011

(86) PCT No.: PCT/KR2011/004251
§ 371 (c)(1),
(2), (4) Date: Aug. 15, 2012

(87) PCT Pub. No.: WO2012/023695
PCT Pub. Date: Feb. 23, 2012

(65) Prior Publication Data
US 2012/0309886 A1 Dec. 6, 2012

(30) Foreign Application Priority Data
Aug. 19, 2010 (KR) .......................... 10-2010-0080419

(51) Int. Cl.
| | | |
|---|---|---|
| C09D 131/04 | (2006.01) | |
| C08K 3/04 | (2006.01) | |
| C08K 5/101 | (2006.01) | |
| C09D 5/18 | (2006.01) | |
| C08K 5/10 | (2006.01) | |
| C08L 31/02 | (2006.01) | |
| C09D 123/08 | (2006.01) | |
| C08K 3/00 | (2006.01) | |
| C08K 7/24 | (2006.01) | |

(52) U.S. Cl.
CPC ........ C09D 123/0853 (2013.01); C08K 3/0058 (2013.01); C08K 2201/001 (2013.01); C08K 7/24 (2013.01)
USPC ................ 524/563; 524/5; 524/315; 524/847

(58) Field of Classification Search
CPC .......... C08K 3/04; C08K 5/01; C09D 131/04; E04B 1/948; E04B 2/205
USPC ...................... 524/563, 847, 5, 315
See application file for complete search history.

(56) References Cited

U.S. PATENT DOCUMENTS

| | | | | |
|---|---|---|---|---|
| 6,340,717 B1 * | 1/2002 | Hargarten et al. | ............... | 522/83 |
| 2007/0069188 A1 * | 3/2007 | Takei et al. | .................... | 252/570 |
| 2008/0280036 A1 * | 11/2008 | Mesa | ............................. | 427/154 |

FOREIGN PATENT DOCUMENTS

| | | |
|---|---|---|
| JP | 10-110121 | 4/1998 |
| JP | 2000-169853 | 6/2000 |
| JP | 2004-224960 | 8/2004 |
| JP | 2008-214463 | 9/2008 |
| KR | 10-0182661 | 4/1999 |
| KR | 10-2008-0102791 | 11/2008 |
| KR | 1020080102791 | * 11/2008 |

OTHER PUBLICATIONS

DA-108H EVA Emulsion Data Sheet—Dairen Chemical Corp.—published Sep. 12, 2008 http://www.perrychem.com/files/DA-108H.pdf.*
International Search Report mailed Feb. 20, 2012 for PCT/KR2011/004251.

* cited by examiner

Primary Examiner — Ling Choi
Assistant Examiner — Ronald Grinsted
(74) Attorney, Agent, or Firm — Lowe Hauptman & Ham, LLP

(57) ABSTRACT

The composition for forming a non-flammable coating comprising (a) 50.4-64.8 wt % of at least one type of a binder resin selected from aqueous or waterborne acrylic resin and aqueous or waterborne vinyl resin; (b) 19.6-25.2 wt % of water; (c) 6-26 wt % of expanded graphite; and (d) 2-4 wt % of kerosene and a non-flammable coating obtained from the composition are disclosed herein. The composition for forming a non-flammable coating according to the invention is superior in terms of drying rate and long-term storage properties, and this composition can be used to form a dense non-flammable coating of a resin-expanded graphite composite on the surface of a base easily so that the non-flammable coating with superior water resistance, heat resistance and mechanical strength may be formed.

13 Claims, No Drawings

COMPOSITION FOR FORMING NON-FLAMMABLE COATING, AND NON-FLAMMABLE COATING OBTAINED THEREFROM

CROSS REFERENCE TO RELATED APPLICATION

This application claims the priority of Korean Patent Application No. 10-2010-0080419, filed on Aug. 19, 2010 in the KIPO (Korean Intellectual Property Office). Further, this application is the National Phase application of International Application No. PCT/2011/004251 filed Jun. 10, 2011, which designates the United States and was published in Korean.

TECHNICAL FIELD

The present invention relates to a composition for forming a non-flammable coating and the non-flammable coating obtained therefrom and more specifically to the composition for forming non-flammable coating that enables to form the non-flammable coating of a dense resin-expanded graphite composite and has superior drying rate, long-term storage properties, water resistance and mechanical strength and the non-flammable coating obtained therefrom.

BACKGROUND TECHNOLOGY

As buildings tend to become larger and higher, building fire often leads to a large scale accident. That's why fire-fighting criteria tend to become reinforced, and non-flammable properties and fireproofing criteria of building finish materials and other facilities are also being reinforced.

Fireproofing paint is the paint used to coat flammable materials including wood, foam sponge and plastic so that ignition may be prevented or ignition time delayed. Such fireproofing paint has two types including that based on fireproofing materials and that result in foaming upon heating to make a shield layer in-between a fireproofing material to shield flame and delay conduction of heat.

The former is prepared by addition of various pigments, non-flammable powder, etc. to fireproofing materials including fireproofing or non-flammable resins and chlorine compounds. The latter is prepared by adding various fire-resistant agents, foaming agents, insulating carbonization agents, carbonization promoters, etc. and using synthetic resins as its binder so that heating results in thermal degradation of a coating and generation of non-flammable gas and that an insulation layer formed by foaming in the shape of sponge of a few centimeters in thickness delays transfer of flame and heat to a flammable material.

The composition for forming non-flammable coating of the invention belongs to the latter. The existing fireproofing paint that belongs to this class, upon contacting flame by its coating, causes its coating ingredient to undergo physical and chemical changes by heat so that the coating under a carbonized state swells as a result of foaming and expansion and plays the role of protecting a base (flammable material) so that it may not be combusted by flame and heat. That is, for the foaming fireproofing paint that is currently used, the binder in the coating composition plays the role of a protective film and forms a carbonized foaming film that swells like sponge by the actions of expanding pigment, fireproofing agent, etc. added in the paint. While it is required to apply a thick coating to form a fireproofing coating with such foaming fireproofing paint, single application effort does not result in the coating of a sufficient thickness so it usually requires applications two to three times. However, if such foaming fireproofing paint is an aqueous base one, low volatility of water results in a low drying rate so that it takes much time to be able to undertake the second application following the first application. Therefore, the existing aqueous foaming and fire-proofing paint is poor in terms of workability. In addition, the aqueous foaming and fireproofing paint is aqueous so that microorganisms may breed easily, which results in the problem of poor long-term storage.

On the other hand, the ethylene-vinyl acetate copolymer emulsion is widely used for construction paint applications, and as the regulations on atmospheric discharge of organic solvents become much stricter, replacement with water-based paints is taking place in the fields where organic solvent based paints have been used. Nevertheless, the water-based paint has disadvantages in terms of water resistance and mechanical properties compared with the organic solvent based paint.

DETAILS OF THE INVENTION

Technical Tasks

The present invention is intended to solve the problems above and one objective of the invention is to provide a composition for forming a non-flammable coating with superior long-term storage properties.

Another objective of the invention is to provide a non-flammable coating with superior non-flammability as well as excellent water resistance, heat resistance and mechanical strength by forming the non-flammable coating of a dense resin-expanded graphite composite on the surface of a base.

Means of Task Solution

According to one aspect of the invention, is provided composition for forming a non-flammable coating comprising,
(a) 50.4-64.8 wt % of at least one type of a binder resin selected from aqueous or waterborne acrylic resin and aqueous or waterborne vinyl resin;
(b) 19.6-25.2 wt % of water;
(c) 6-26 wt % of expanded graphite; and
(d) 2-4 wt % of kerosene.

According to another aspect of the invention, is provided the non-flammable coating obtained by applying and drying a composition for forming a non-flammable coating comprising, (a) 50.4-64.8 wt % of at least one type of a binder resin selected from aqueous or water borne acrylic resin and aqueous or waterborne vinyl resin; (b) 19.6-25.2 wt % of water; (c) 6-26 wt % of expanded graphite; and (d) 2-4 wt % of kerosene.

It is preferred that the binder resin is an ethylene-vinyl acetate copolymer.

The (a) and (b) ingredients may be included in the form of 70-90 wt % of an ethylene-vinyl acetate emulsion with solid contents of 72 wt %.

The ethylene-vinyl emulsion may contain polyvinyl alcohol and a surfactant as its protective colloid.

The composition for forming a non-flammable coating may further contain 0.5-2 wt. parts of ammonia based on 100 wt. parts of the composition for forming a non-flammable coating.

The composition for forming a non-flammable coating may further comprise 0.1 to 0.6 wt. part of an ionic alkaline earth metal crosslinkage agent selected from a group comprising calcium hydroxide, magnesium hydroxide and magnesium carbonate based on 100 wt. parts of the composition for forming a non-flammable coating.

Effects of the Invention

The composition for forming a non-flammable coating of the invention has superior non-flammability by the action of its expanded graphite. The composition for forming a coating of the invention may be applied to various products and building structures. When the non-flammable coating of a dense resin-expanded graphite composite that has been formed on the surface of a base by the composition of the invention is contacted by flame, it becomes heated so expanded graphite covers the base surface and carbon dioxide generated by binding of expanded graphite with oxygen may extinguish flame. Therefore, when the composition for forming a non-flammable coating of the invention is used to form a non-flammable composition inside various building structures and on electric wire, communication line, etc., propagation of flame may be prevented or sufficiently delayed. In particular, if an electric wire is coated with the composition of the invention, flame incurred by an electric short-circuit or leakage may be prevented or sufficiently delayed. When the composition for forming a non-flammable coating of the invention is used to form a non-flammable coating on the surface of a base, effects of fire prevention are superior.

The composition for forming a non-flammable coating of the invention has been greatly improved on its drying rate compared with the existing composition for forming a non-flammable coating with a similar composition so its workability is superior.

The composition for forming a non-flammable coating of the invention enables to effectively stop microorganism generation compared with the existing composition for forming a non-flammable coating with a similar composition so its long-term storage properties are superior.

While the composition for forming a non-flammable coating of the invention is an aqueous composition, the non-flammable coating formed by it also has much superior water resistance and mechanical strength compared with the coating formed with the existing aqueous composition for forming a non-flammable coating with a similar composition.

SPECIFIC DETAILS FOR IMPLEMENTATION OF THE INVENTION

In the following are described the composition for forming a non-flammable coating of the invention and the non-flammable coating formed with it in further detail referring to a preferred embodiment. The composition for forming a non-flammable coating according to one aspect of the invention comprises (a) 50.4-64.8 wt % of at least one type of a binder resin selected from aqueous or water borne acrylic resin and aqueous or waterborne vinyl resin; (b) 19.6-25.2 wt % of water; (c) 6-26 wt % of expanded graphite; and (d) 2-4 wt % of kerosene. The binder resin of the ingredient (a) is at least one type of a binder resin selected from aqueous or waterborne acrylic resin and aqueous or waterborne vinyl resin. The aqueous or waterborne acrylic resin is the polymer of acrylic acid, methacrylic acid and esters of the acids or the copolymer between the above and the comonomer of methyl methacrylate, methyl acrylate, or acrylonitrile and means to have solubility in water or dispersion characteristics with the help of at least surfactant and/or protective colloid. The vinyl resin is the polymer of a monomer having a vinyl group such as vinyl acetate, styrene, vinyl chloride and divinyl ether, the copolymer between such vinyl monomers and a comonomer such as ethylene and propylene, or the partial hydrosylate of such polymer and copolymer and means to have solubility in water or dispersion characteristics with the help of at least surfactant and/or protective colloid.

It is preferred that the binder resin is a ethylene-vinyl acetate copolymer since it enables to obtain superior availability, stickiness, cold resistance and transparency and afford a stable emulsion. The ethylene-vinyl acetate copolymer is a copolymer between ethylene and vinyl acetate and contains the large group of vinyl acetate in a poly ethylene chain so its crystallinity is lower than that of polyethylene but it has elasticity and superior cold resistance. As contents of vinyl acetate increase, viscosity, stickiness, transparency, cold resistance, long-term stability, weatherability, density, rubber elasticity, flexibility and compatibility with other binder resins and plasticizers improves, and when contents of vinyl acetate reach 50% or higher, an emulsion with superior adhesion may be available but its softening temperature becomes deteriorated.

While the molecular weight of vinyl acetate is not particularly limited as long as it can form a coating, it ranges 8,000 to 50,000 based on the weight-averaged molecular weight from the total aspect of mechanical properties and application workability, preferably ranges 10,000 to 20,000, and more preferably ranges 10,000 to 15,000. As its molecular weight increases, toughness, stress crack resistance and shock resistance improves, and application workability and surface gloss becomes deteriorated.

Contents of the ingredient (a) binder resin are adjusted at 50.4-64.8 wt %. If contents of the binder resin are less than 50.4 wt %, the viscosity of a composition becomes so low that workability of coating formation may become poor. On the contrary, if contents of the binder resin exceed 64.8, the viscosity of a composition becomes so large that it may become difficult to form the coating of a uniform thickness and workability of coating formation may become poor. If the thickness of a coating is not uniform, not only its appearance becomes poor but also cracks occur between its thick area and thin area on a long-term basis, which may cause deterioration of water resistance.

Water of the ingredient (b) plays the role of a solvent or dispersion medium, and in the present invention is used water as its solvent or dispersion medium taking into account that the regulations on atmospheric discharge of organic solvents become stricter. Contents of water in the ingredient (b) are adjusted at 19.6-25.2 wt %. If contents of water are less than 19.6 wt %, viscosity of a composition becomes so large that it may become difficult to form the coating of a uniform thickness, which results in poor workability of coating formation. If the thickness of a coating is not uniform, not only its appearance becomes poor but also cracks occur between its thick area and thin area on a long-term basis, which may cause deterioration of water resistance. If contents of water exceed 25.2 wt %, viscosity of its composition is so low that workability of coating formation may become poor, and the thickness of the coating formed by single application, may become too thin. While the composition of the invention is basically an aqueous composition, it may contain a small amount of an organic solvent that enables to enhance solubility of its binder resin. For example, if the binder resin is an ethylene-vinyl acetate copolymer, the composition of the invention may contain an organic solvent such as ethyl acetate, methyl ethyl ketone, toluene, methylene chloride, 1,2-dichloroethane, cyclohexane, hexane, butanone, acetone, xylene, chloroform, ethyl acetate/hexane (EA/HEX) cosolvent, 1,2-dichloroethane/cyclohexane (DCE/CYH) cosolvent, methyl ethyl ketone/heptane (MEK/MEP) cosolvent, and acetone/chloroform (AC/CF) cosolvent at a small mount, for example, the amount that does not result in phase separation with its primary solvent or primary dispersion medium of water.

The binder resin and solvent/dispersion medium ingredients of (a) and (b) may be contained in the composition of the invention in the form of 70-90 wt % of an ethylene-vinyl acetate emulsion with solid contents of 72 wt %. If solid contents of an ethylene-vinyl acetate emulsion are less than the above upon formulation of a composition, the amount of emulsion formulation needs to be adjusted. The ethylene-vinyl acetate emulsion may contain polyvinyl alcohol and a surfactant as its protective colloid to increase stability of an emulsion. It is preferred to use a nonionic surfactant from the standpoint of maintaining pH of the composition obtained to be close to neutrality. The nonionic surfactant may, for example, be at least one type selected from a group comprising polyoxyethylene polyoxypropylene block copolymer, polyoxyethylene polyoxypropylene alkyl ether, polyoxyethylene polyoxypropylene alkyl phenol, polyoxyethylene polyoxypropylene polystyryl phenyl ether, and polyoxyethylene polyoxypropylene castor oil.

As described above, the composition for forming a non-flammable coating contains the expanded graphite of the ingredient (c).

Expanded graphite is prepared by injection of a chemical in-between the layers of graphite in a natural scale phase, and such expanded graphite is expanded by the gas generated from the chemical that has been injected upon heating. The expanded graphite may be manufactured by the method, for example, comprising a first step in which $SO_3$ gas in a gas phase formed in the manufacturing process of fuming sulfuric acid or fuming sulfuric acid in a liquid phase is used to oxidize graphite, a second step in which oxidized graphite is washed with a rinse solution; and a third step in which washed graphite is subjected to illumination with microwave or heat treatment for expansion.

For the composition of the invention is used the powder of such expanded graphite. Because graphite does not burn at 3350° C. but sublimes, it expands very safely by common flame to form a protective film, and its scale-like three-dimensional structure plays the role of blocking heat and flame more effectively. Expanded graphite expands in a coating at approximately 220° C. or higher when flame gets in contact with a coating, and a tortuous and elevated carbonized resin-graphite composite of 0.3 mm-0.5 mm in thickness and 5-20 mm in length forms a very dense fireproofing layer with a binder resin to block flame and heat. That is, the shield layer (carbonized resin-graphite composite) formed by the non-flammable composition of the invention is not a foamed spherical body like the sponge of the existing fire-proofing paint but takes the form in which short fibers have been densely elevated. Examining the foam coating that is formed after flame is applied to the base coated with the existing fireproof paint and the base coated with the non-flammable composition of the invention that takes the form of the carbonized resin-graphite composite after flame is applied under a microscope, the foam coating formed by the existing fireproof paint takes a hemi-spherical form upon foaming of the coating, but the fireproof layer formed by the non-flammable composition of the invention takes the form in which short and tortuous villi like human hair are raised densely toward flame. Therefore, when the composition of the invention is used, its flame shield effects are superior and the problem that arises from breaking a foam coating and has been found in forming existing foam coating to shield flame may be eliminated.

The expanded graphite that is used for the non-flammable composition of the invention is different from the non-expanded graphite pigment and can be usually obtained easily in the market. Such available expanded graphite pigment may include HCE-995270, HCE-958020, etc. marketed by Hyundai Koma Industrial Development Co., Ltd.; the expanded graphite of Qingdao Kropfmuehl Graphite Co., Ltd. (Product No. 91/155 EWG); Kropfmuehl A 15/90 marketed by Graphite Kropfmuehl AG (located in Hausenberg, Germany); Sigraflex FR 90-60/80 Type 2 marketed by Norman Lasman GmbH. Und Company (located in Hamburg, Germany); and Expan-C-8099 LTE marketed by Lineta (located in Copenhagen, Denmark). However, graphite may be mixed with the granularized aqueous alkali metal silicate expanded composition that is marketed as "Expantrol (merchandise name) 4BW" by 3M (located in St. Paul, Minn., USA.)

In the composition for forming a non-flammable coating of the invention contents of its expanded graphite are 6-26 wt %, preferably 10-20 wt % and more preferably 10-15 wt %. If contents of the expanded graphite are less than 6 wt %, blocking effects of flame and heat are insufficient, and if 26 wt % are exceeded, blocking effects of flame does not increase in proportion to the amount increased and it makes it difficult to apply a composition uniformly. If the composition of the invention contains other fireproofing agents, the mixing ratio may be appropriately adjusted within the range of the mixing amount depending upon the type of a fireproofing agent.

The composition for forming a non-flammable composition of the invention contains 2-4 wt % of kerosene. While the inventors of the invention were contemplating on the problem that the composition of the invention required much time for complete drying following coating application because it was an aqueous composition though it complied with the current market trends of pursuing environment-friendly products, they discovered that, upon addition of an appropriate amount of kerosene to the composition of the invention, effects of fast drying unexpectedly occurred and productivity of the application work for forming a non-flammable coating could be significantly enhanced. Gasoline or diesel whose chemical structure is almost similar to that of kerosene cannot exhibit effects of fast drying if it is mixed with the composition of the invention. For example, gasoline is so volatile that it evaporates too fast to be used if a small amount of it is mixed with the composition of the invention. When diesel is added to the composition of the invention, solid contents of the composition become lumped and sticky so that it is difficult to obtain a uniform non-flammable coating with it. If contents of kerosene in the composition of the invention are less than 2 wt %, effects of fast drying are insufficient, whereas if 4 wt % are exceeded, such problem may arise that the coating is easily peeled off from a base after the coating has been applied.

The composition for forming a non-flammable coating of the invention may further contain 0.5-2 wt. parts of ammonia based on 100 wt. parts of the composition for forming a non-flammable coating as well. When the composition of the invention contains ammonia, such effect that microorganisms may not breed easily becomes available though it is an aqueous composition. Therefore, if the composition of the invention contains ammonia, its long-term storage properties may be enhanced.

When contents of ammonia are less than 0.5 wt. part based on 100 wt. part the composition for forming a non-flammable coating, its suppression of microorganism breeding is insufficient. If contents of ammonia exceed 2 wt. parts, its suppression of microorganism breeding does not increase in proportional to the amount of addition increased but it may rather cause odor.

The composition for forming a non-flammable coating of the invention may further contain 0.1 to 0.6 wt part of an ionic alkali earth metal crosslinking agent selected from a group comprising calcium hydroxide, magnesium hydroxide, magnesium carbonate and aluminum hydroxide based on 100 wt. parts of the composition for forming a non-flammable coating as well. The ionic alkali earth metal crosslinking agent enables to enhance water resistance, heat resistance and mechanical properties of the non-flammable coating formed with the composition of the invention. That is, the calcium ion ($Ca^{2+}$) and magnesium ion ($Mg^{2+}$) formed from the ionic alkali earth metal crosslinking agent crosslinks polymeric chains by forming ionic crosslinkages among such ethylene-vinyl acetate copolymer molecule chains so that swelling properties of the non-flammable coating obtained from the composition of the invention with respect to water are lowered and its water resistance is increased. That is, when the ionic alkali earth metal crosslinking agent above is added to ethylene-vinyl acetate, as expressed in the following reaction equation, the ester bonding of a vinyl acetate unit in the binder polymer chain undergoes the nucleophilic hydrolysis reaction (discharge of acetic acid) with the hydroxide anion ($OH^-$) formed from an ionic crosslinking agent so that intermolecular crosslinkages among the ethylene-vinyl acetate copolymer molecular chains are formed.

[See Source]

Thus after intermolecular crosslinkages are formed among the binder polymer chains, the non-flammable coating formed from the composition of the invention is enhanced not only in its water resistance but also in its heat resistance and mechanical properties. For example, the non-flammable coating formed from the composition of the invention is enhanced for its tensile strength and glass transition temperature upon introduction of such crosslinkages.

It is preferred that contents of its sonic alkali earth metal crosslinking agent in the composition for forming a non-flammable coating range 0.1 to 0.6 wt. part based on 100 wt. parts of the composition for forming a non-flammable coating. When contents of the ionic alkali earth metal crosslinking agent are less than 0.1 wt. part based on 100 wt. parts of the composition for forming a non-flammable coating, the density of the crosslinkage introduced among molecular chains of the binder polymeric resin is so low that enhancement on its water resistance, heat resistance and mechanical properties is slight, whereas when 0.6 wt. part is exceeded, the density of the crosslinkage introduced among molecular chains of the binder polymeric resin becomes so large that there arises concern for poor flexibility of the coating.

When the ionic alkali earth metal crosslinking agent used contains magnesium ions such as magnesium hydroxide and magnesium carbonate, fireproofing properties may be further enhanced in addition to enhancement on water resistance, heat resistance and mechanical strength as a result of ionic crosslinking effects. The composition for forming a non-flammable coating of the invention may further comprise dispersion agent, other organic fireproofing agent, filler, etc. depending upon the need.

The non-flammable coating according to another aspect of the invention of the invention is formed by applying and drying the composition for forming a non-flammable coating according to one aspect of the invention described above on an appropriate base. That is, the non-flammable coating according to another aspect of the invention is obtained by applying the composition for forming a non-flammable coating comprising (a) 50.4-64.8 wt % of at least one type of a binder resin selected from aqueous or water borne acrylic resin and aqueous or waterborne vinyl resin; (b) 19.6-25.2 wt % of water; (c) 6-26 wt % of expanded graphite; and (d) 2-4 wt % of kerosene on an appropriate base and drying it.

The base on which the composition for forming a non-flammable coating of the invention is not particularly limited. After the composition of the invention is applied on, for example, various building structures of concrete material, plastic products and foamed plastic foam such as foamed polyurethane foam, electric wire and communication line coated with an organic polymer, wood, paper, and iron-made structures and dried, the non-flammable coating according to another aspect of the invention is obtained.

While the present invention is described below in detail based on its examples, they are merely illustrative and the invention is not limited by the examples below.

EXAMPLES

Examples 1-9

Formulation of Composition for Forming Non-Flammable Coating

According to the contents described in Table 1 below, (a) EVA emulsion, (b) expanded graphite, and (c) kerosene and optionally (d) ammonia and (e) calcium hydroxide or (f) magnesium hydroxide are placed in a mixer and mixing was carried out uniformly at the rate of 50 rpm for 5 min before defoaming was carried out to form a uniform composition for forming a non-flammable coating.

Comparative Examples 1-3

Formulation of Composition for Forming Non-Flammable Coating

As described in Table 2 below, a composition for forming a non-flammable coating was formed by the same method as in the case of Examples 1-9 except that only (a) EVA emulsion and (b) expanded graphite only were used.

TABLE 1

|  | Example 1 | Example 2 | Example 3 | Example 4 | Example 5 | Example 6 | Example 7 | Example 8 | Example 9 |
|---|---|---|---|---|---|---|---|---|---|
| (a) EVA emulsion (wt %)* | 70 | 80 | 90 | 70 | 80 | 90 | 70 | 80 | 90 |
| (b) Expanded graphite (wt %)* | 26 | 18 | 6 | 26 | 18 | 6 | 26 | 18 | 6 |
| (c) Kerosene (wt %)* | 4 | 2 | 4 | 4 | 2 | 4 | 4 | 2 | 4 |
| (d) Ammonia (wt %)** | — | — | — | 2 | 1 | 0.5 | 0.5 | 0.5 | 0.5 |
| (e) Calcium hydroxide (wt part)** | — | — | — | 0.1 | 0.3 | 0.6 | — | — | — |

TABLE 1-continued

|  | Example 1 | Example 2 | Example 3 | Example 4 | Example 5 | Example 6 | Example 7 | Example 8 | Example 9 |
|---|---|---|---|---|---|---|---|---|---|
| (f) Magnesium hydroxide (wt parts)** | — | — | — | — | — | — | 0.1 | 0.2 | 0.6 |

*wt % refers to the wt % of the total amount of the three ingredients (a) + (b) + (c).
**Contents of ingredients (d)-(f) are indicated by external percentiles based on 100 wt. parts of ingredients (a) + (b) + (c).
(a) EVA emulsion: DA-108H manufactured by Dairen Chemical Corporation (solid contents of 72 wt %).
(b) Expanded graphite: The product number 91/155 EVG manufactured by Qingao Kropfmuehl Graphite Co., Ltd. was used as expanded graphite.
(c) Kerosene was purchased from a gas station of L G Oil Co., Ltd. and used.
(d) Ammonia: Ammonia water (28%) was purchased from Hanil Chemical Co., Ltd. and used. The contents listed in the table above represent the calculated contents of ammonia only.
(e) Calcium hydroxide: Industrial grade (CaO 70%, 68% 100 Mesh) calcium hydroxide of Baek Kwang Material Products Co., Ltd. was used.
(f) Magnesium hydroxide: Magnesium hydroxide powder (Product No. 63078) purchased from Sigma Aldrich was used.

TABLE 2

|  | Comparative Example 1 | Comparative Example 2 | Comparative Example 3 |
|---|---|---|---|
| (a) EVA emulsion (wt %)* | 70 | 80 | 90 |
| (b) Expanded graphite (wt %)* | 26 | 18 | 6 | wt % represents the wt % with respect to the total of 2 ingredients (a) + (b).
(a) EVA emulsion: DA-108H manufactured by Dairen Chemical Corporation (solid contents of 72 wt %).
(b) Expanded graphite: The product number 91/155 EVG manufactured by Qingdao Kropfmuehl Graphite Co., Ltd. was used as expanded graphite.

Test for Long-Term Storage of Compositions

Each of the compositions obtained from Examples 1-9 and Comparative Examples 1-3 was placed in a plastic bottle and stored at a room temperature for 30 days while it was stoppered. After 30 days were elapsed, mold generation and its extent of generation was visually evaluated from the appearance of a composition. Long-term storage properties of their samples were evaluated according to the following criteria:
◎: No changes in appearance
○: Mold generated at less than 3% of solution surface area
Δ: Mold generated at 3% or more of solution surface area Fireproofing Performance Test Each of the composition for forming a non-flammable coating obtained from Examples 1-9 and Comparative Example 1-3 was applied on the polyurethane foam of 25 cm×20 cm×2 cm in size with a paint roller brush so that the thickness of a dried non-flammable coating might reach 1 mm±0.02 mm. The strong flame of 956-957° C. that was discharged from the torch attached to a portable butane can was used in a vertical direction to make it contact the non-flammable coating of the sample obtained as in the above. At this time non-flammable characteristics of the sample were evaluated according to the following criteria:
◎: A non-flammable coating is combusted by flame and a tortuous and elevated carbonized resin-graphite composite is used to form a dense fireproofing layer only while the body the polyurethane foam does not result in any changes in its appearance for 1 min upon contacting the flame and temperature increase is less than 6° C.
○: A non-flammable coating is combusted by flame and a tortuous and elevated carbonized resin-graphite composite is used to form a dense fireproofing layer only while the body the polyurethane foam does not result in any changes in its appearance for 1 min upon contacting the flame and temperature increase is 6° C. or more and less than 15° C.
Δ: A non-flammable coating is combusted by flame and a tortuous and elevated carbonized resin-graphite composite is used to form a dense fireproofing layer only while the body the polyurethane foam does not result in any changes in its appearance for 1 min upon contacting the flame and temperature increase is 15° C. or more and less than 40° C.
X: A non-flammable coating is combusted by flame and a tortuous and elevated carbonized resin-graphite composite is used to form a dense fireproofing layer while the body of polyurethane foam begins to deform for 1 min upon contacting the flame and temperature increase of the polyurethane is 40° C. or higher.

Water-Resistance Test on Non-Flammable Coating

Each of the compositions for forming a non-flammable coating obtained from Examples 1-9 and Comparative Examples 1-3 was applied with a paint roller brush on a glass plate so that the thickness of a dried non-flammable coating might reach 1 mm±0.02 mm. After each sample with its glass plate was allowed to swell in tap water of a room temperature for one week, the extent of swelling on the non-flammable coating was visually evaluated after one week was elapsed based on the following criteria.
◎: The coating does not fall off a glass plate and hardly swells.
○: The coating does not fall off a glass plate and slightly swells.
Δ: The coating does not fall off a glass plate but undergoes swelling:
X: The coating balls off a glass plate and swells a great deal.

Fast Drying Test on Non-Flammable Coating

Each of the composition for forming a non-flammable coating obtained from Examples 1-9 and Comparative Example 1-3 was applied once on the polyurethane foam of 25 cm×20 cm×2 cm in size with a paint roller brush so that the thickness of a dried non-flammable coating might reach 0.5 mm±0.02 mm.

Afterward, the time for set to touch was measured for the applied non-flammable coating to evaluate fast drying characteristics of the non-flammable coating. Herein, the time for set to touch means the time elapsed until no composition is found on a finger upon touching coating surface with a finger.

Sensory Test on Mechanical Properties

Each of the compositions for forming a non-flammable coating obtained from Examples 1-9 and Comparative Examples 1-3 was applied with a paint roller brush on a glass plate so that the thickness of a dried non-flammable coating might reach 1 mm±0.02 mm. After each sample was removed from its glass plate, the coating was subjected to the test in which it was pulled by both hands, and hardness of coating surface was evaluated by the sensory test based on the following criteria:
◎: Coating does not stretch easily and its surface is hard.
○: Coating does not stretch easily and its surface slightly hard.
Δ: Coating stretches slightly until it is destroyed and its surface is slightly hard.
X: Coating stretches well until it is destroyed and its surface is not hard.

In Table 3 below are summarized results of the above tests.

TABLE 3

|   | Long-term storage | Fire-proofing performance | Water resistance test | Mechanical properties |
|---|---|---|---|---|
| Example 1 | Δ | ⊙ | Δ | Δ |
| Example 2 | Δ | ○ | Δ | Δ |
| Example 3 | Δ | ○ | Δ | Δ |
| Example 4 | ⊙ | ⊙ | ○ | ○ |
| Example 5 | ○ | ○ | ○ | ○ |
| Example 6 | ○ | ○ | ⊙ | ⊙ |
| Example 7 | ○ | ⊙ | ○ | ○ |
| Example 8 | ○ | ○ | ○ | ○ |
| Example 9 | ○ | ○ | ⊙ | ⊙ |
| Comparative Example 1 | Δ | ○ | Δ | Δ |
| Comparative Example 2 | Δ | ○ | Δ | Δ |
| Comparative Example 3 | Δ | ○ | Δ | Δ |

Referring to Table 3, it may be realized that the composition for forming a non-flammable can be used to form the non-flammable coating with superior non-flammable characteristics as well as uniformly superior long-term storage properties, water resistance and mechanical properties. In particular, Examples 4-9 in which both ammonia and an ionic alkali earth metal crosslinking agent were used resulted in very superior water resistance and mechanical properties.

The invention claimed is:

1. A composition for forming a non-flammable coating comprising:
   (a) 50.4-64.8 wt % of at least one binder resin selected from the group consisting of an aqueous or waterborne acrylic resin and an aqueous or waterborne vinyl resin;
   (b) 19.6-25.2 wt. % of water;
   (c) 6-26 wt. % of expanded graphite; and
   (d) 2-4 wt. % of kerosene.

2. The composition for forming a non-flammable coating according to claim 1, wherein the binder resin is an ethylene-vinyl acetate copolymer.

3. The composition for forming a non-flammable coating according to claim 1, wherein the components (a) and (b) are contained in the form of 70-90 wt % of an ethylene-vinyl acetate emulsion based on the weight of the total composition with a solid contents of 72 wt. %.

4. The composition for forming a non-flammable coating according to claim 3, wherein the ethylene-vinyl acetate emulsion comprises polyvinyl alcohol and a surfactant as its protective colloid.

5. The composition for forming a non-flammable coating according to claim 1, further comprising 0.5-2 wt. % of ammonia based on the total weight of the composition.

6. The composition for forming a non-flammable coating according to claim 1, further comprising 0.1 to 0.6 wt. % of an ionic alkali earth metal crosslinking agent comprising calcium hydroxide based on the total weight of the composition.

7. A non-flammable coating obtained by applying the composition according to claim 1 to a surface.

8. A non-flammable coating obtained by applying the composition according to claim 2 to a surface.

9. A non-flammable coating obtained by applying the composition according to claim 3 to a surface.

10. A non-flammable coating obtained by applying the composition according to claim 4 to a surface.

11. A non-flammable coating obtained by applying the composition according to claim 5 to a surface.

12. A non-flammable coating obtained by applying the composition according to claim 6 to a surface.

13. The composition for forming a non-flammable coating according to claim 1, further comprising 0.1 to 0.6 wt. % of an ionic alkali earth metal crosslinking agent comprising magnesium hydroxide based on the total weight of the composition.

* * * * *